Patented Nov. 30, 1926.

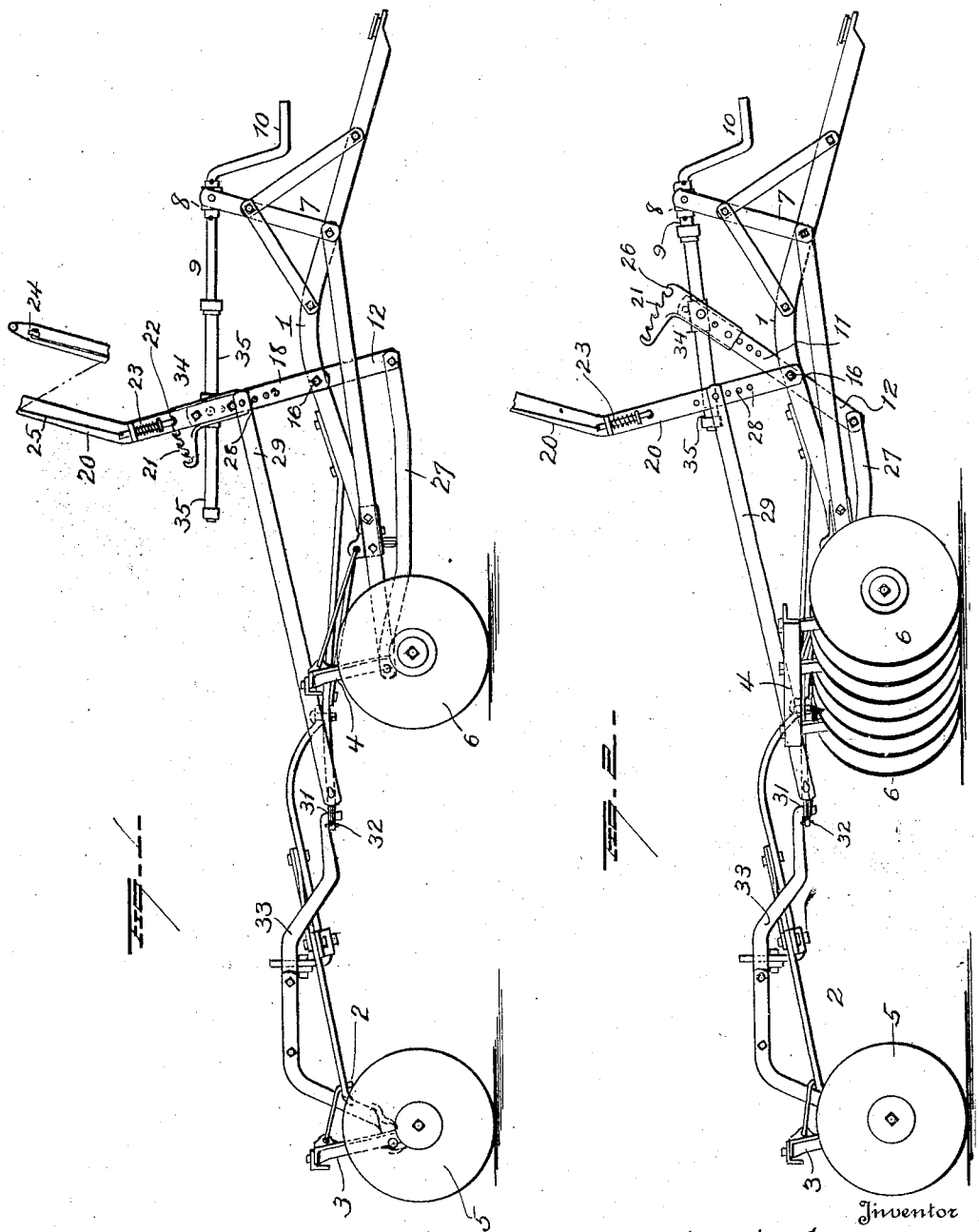

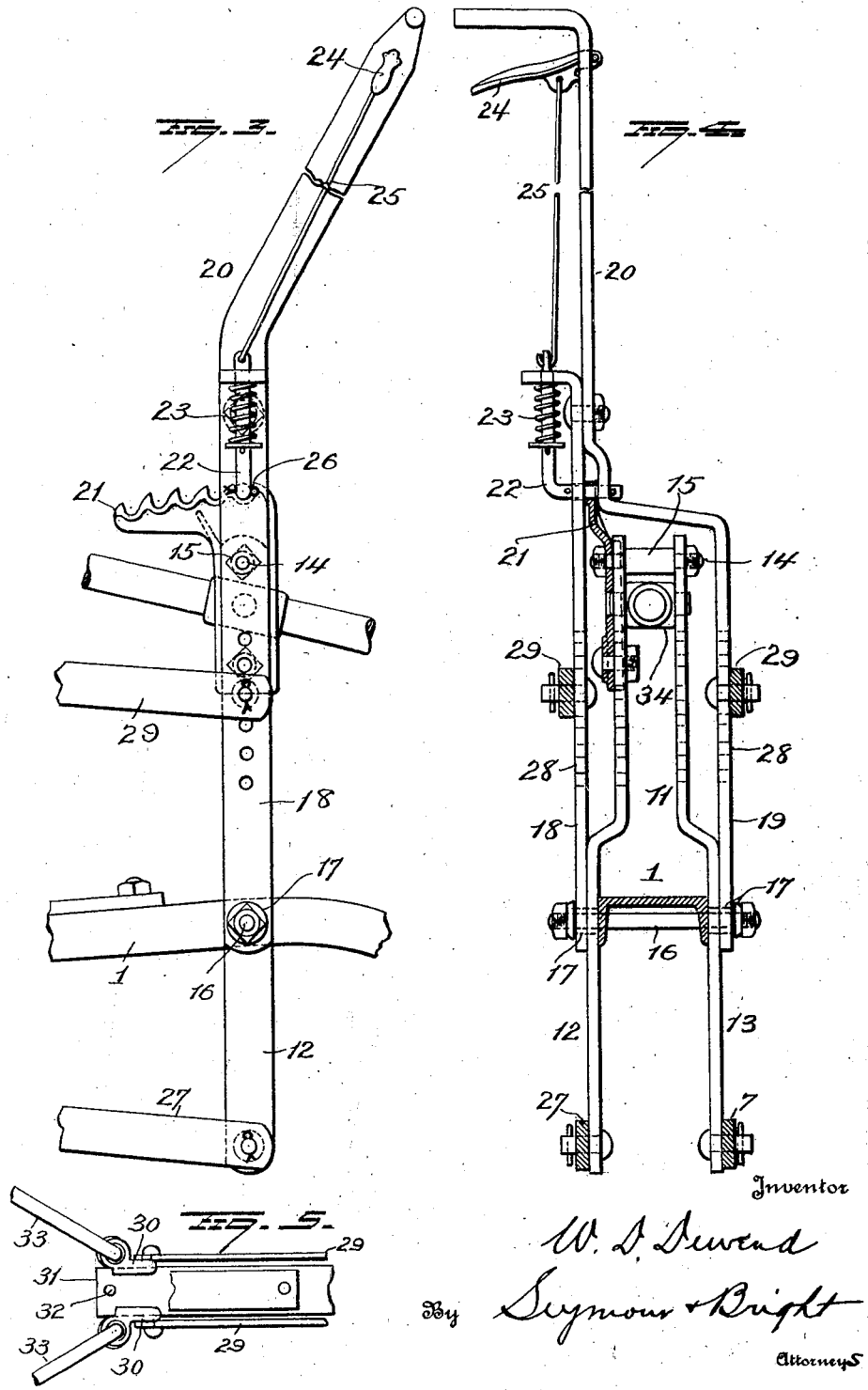

1,608,977

UNITED STATES PATENT OFFICE.

WILLIAM D. DEWEND, OF SOUTH BEND, INDIANA, ASSIGNOR TO OLIVER CHILLED PLOW WORKS, OF SOUTH BEND, INDIANA.

DISK HARROW.

Application filed May 7, 1924. Serial No. 711,676.

This invention relates to improvements in harrows of the multiple tandem gang disk type, and has particular reference to means for changing and adjusting the angularity of the front and rear gangs,—the object of my present invention being to provide simple and efficient means which shall be operable to angle the gangs of both pairs simultaneously or to permit the angular shifting of the rear pair of gangs independently of the front pair.

With this and other objects in view, the invention consists in certain novel features of construction and combinations of parts as hereinafter set forth and pointed out in the claims.

In the accompanying drawings,—

Figure 1 is a side view of a multiple gang disk harrow of the tandem type, showing the positions of the shifting means when the gangs of each pair are straight or in longitudinal alignment with each other.

Figure 2 is a similar view showing the parts in the positions which they may assume when the gangs of the front pair are in angled relation to each other and the gangs of the rear pair are straight or in longitudinal alignment with each other.

Figure 3 is an enlarged side view showing the shifting lever and adjacent parts.

Figure 4 is an enlarged front view (partly in section) of said shifting lever and adjacent parts, and Figure 5 is an enlarged detail view showing portions of the angling connections for the rear gangs.

In Figures 1 and 2 of the drawings, I have shown my improvements as applied to a multiple gang disk harrow such as shown and described in application filed by me October 16, 1922, and designated by Serial No. 594,888.

The harrow embodies two frames 1 and 2, with each of which, two disk gang frames are pivotally connected, the rear gang frames 3—3 being arranged in tandem with the front gang frames 4—4 and disk gangs 5 and 6 are mounted in the respective rear and front gang frames. The front gang frames are pivotally connected intermediate their ends with the front frame 1 and the rear gang frames are pivotally connected intermediate of their ends with the rear frame 2.

A braced standard 7 is secured to the forward portion of the front frame 1 and carries a pivoted sleeve 8, through which a manually operable screw shaft 9 passes, said shaft being provided at its forward end with a crank or handle 10 to facilitate its manual operation.

A lever 11 is located rearwardly of the standard 7 and is pivotally supported between its ends by the forward frame 1. This lever comprises two members 12—13 spaced apart and connected at their upper ends by means of a bolt 14,—a sleeve 15 being mounted on said bolt between the respective lever members 12 and 13. To facilitate the pivotal mounting of the members of lever 11, a rod or bolt 16 is passed through the depending flanges of a part of the frame 1 and carries near its respective ends, bushings 17 on which the lever members have pivotal mounting. The bolt 16 and bushings 17 have sufficient length to permit the pivotal mounting thereon of the members 18 and 19 of a hand lever 20,—said lever members 18 and 19 being disposed respectively outside of the lever members 12 and 13 of lever 11. A rack 21 is secured to the lever member 12 and projects upwardly beyond the same to receive a detent 22 carried by the lever 20. This detent is normally forced towards the rack by means of a spring 23 and a finger lever 24 is mounted on the lever 20 and connected by a rod 25, with the detent 22 for raising the same out of engagement with the rack. The teeth forming the rack are such that the detent may ride over them from notch to notch when the lever 20 is moved forwardly, but the forward notch 26 of the rack is made with approximately parallel walls so that when the detent enters the same, the lever 20 will be positively held against movement in either direction, for a purpose hereinafter explained.

The lower arms of the lever members 12 and 13 are connected by a rod 27 with the inner end portions of the respective front gang frames. The members 18 and 19 of the hand lever 20 are provided each with a plurality of perforations 28 permitting the adjustable connection with said lever members of the forward end portions of rods 29—29. The rear ends of the rods 29 are connected with a block 30 mounted to slide on an extension 31 of the front frame and the rearward movement of said block is limited by means of a pin 32 passing through the frame extension 31 near the rear end of the latter. The block or slide 30 is connected by means of rods 33—33 with the inner end portions of the rear gang frames.

The lever 11 has pivotally mounted between the upper portions of its members 12 and 13, a nut 34 through which the threaded portion of the shaft 9 passes and said threaded portion of the shaft and the threaded interior of the nut may be protected by means of tubular members 35 projecting respectively in opposite directions from said nut.

From the construction and arrangement of parts above described, it is apparent that when the screw shaft 9 is turned and the lever 20 is in locked engagement with the toothed segment 21 on the lever 11 as shown in Figure 1, both levers will be turned on their pivotal mountings and both the front and rear gangs will be shifted simultaneously to adjust their angularities or to bring the gangs of each pair into longitudinal alignment. By releasing the lever 20 from locked relation with the lever 11, said lever 20 may be moved independently of the lever 11 and thus the rear gangs may be shifted by manipulation of said lever 20 without affecting the angularity of the front gangs. When the rear gangs become clogged with dirt and trash, the operator may quickly shift them with the use of the lever 20 to bring them into longitudinal alignment and as they pass over the accumulation of trash he can reset them to their proper working angle.

If, when the parts are in the positions shown in Figure 2, the shifting lever 20 be moved forwardly, the detent 22 will ratchet over the first notches of the segment 21 but will be stopped at the last notch 26 which has approximately parallel walls as previously explained, and the connection will then be such that all the gangs will assume correct straightened position when the screw shaft shall have been operated to bring the levers to the positions shown in Figure 1. Or should the lever to left in the position shown in Figure 2 and the screw shaft operated to straighten the gangs, the lever will remain in its position by reason of the stop pin 32, and the detent 22 will ratchet over the first notches of the rack or segment 21 and come to rest in the last notch 26, in which position all the gangs will be straight. By providing adjustable connections of the rods 29 with the members of the lever 20, the points of connection of said rods to said lever members may be made to so vary that the degree of angularity to which the rear gangs may be moved may be controlled.

Having fully described my invention what I claim as new and desire to secure by Letters-Patent,—

1. In a multiple gang disk harrow, the combination with framework and pivoted disk gangs arranged in tandem, of a lever pivotally mounted intermediate of its ends, connections between the lower portion of said lever and the front disk gang, manually operable means for operating said lever, a pivoted hand lever, means connecting said hand lever with the rear disk gang, a segment carried by the first-mentioned lever and having ratchet teeth, and a detent carried by the hand lever and movable in one direction over said ratchet teeth and adapted to engage said teeth to lock said levers together so that they will be movable together in one direction, said segment provided with a forward notch having approximately parallel walls to receive the detent and hold the hand lever against independent movement in either direction.

2. In a multiple-gang disk harrow, the combination with framework and pairs of front and rear disk gangs, of a lever comprising two members mounted between their ends, connections between the lower portions of the lever members and the respective front gangs, a nut having pivotal connection between the upper portions of the lever members, a manually operable screw shaft passing through said nut, a hand lever comprising two members, means for locking said hand lever to the first mentioned lever, and connections between said hand lever members and the respective rear gangs, the connection of the forward ends of said last mentioned connections with the hand lever being adjustable.

3. In a multiple-gang disk harrow, the combination with front and rear frames, a pair of front disk gangs having pivotal connection with the front frame, a pair of disk gangs having pivotal connection with the rear frame, of a lever pivotally supported intermediate of its ends, manually operable means for shifting said lever, connections between the lower portions of said lever and the front gangs, a hand lever pivotally supported by the front frame, a toothed segment carried by the first mentioned lever, a detent carried of the hand lever for cooperation with said segment, a block mounted to slide on a rear member of the front frame, a pin to limit the rearward movement of said block, connections between said block and the hand lever, and connections between said block and the rear disk gangs.

In testimony whereof, I have signed this specification.

WILLIAM D. DEWEND.